(12) United States Patent
Yamamura

(10) Patent No.: US 8,023,192 B2
(45) Date of Patent: Sep. 20, 2011

(54) LENS ARRAY, LENS UNIT, LED HEAD, EXPOSING UNIT, IMAGE FORMING APPARATUS, AND IMAGE READING APPARATUS

(75) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 12/654,986

(22) Filed: Jan. 12, 2010

(65) Prior Publication Data

US 2010/0177400 A1     Jul. 15, 2010

(30) Foreign Application Priority Data

Jan. 13, 2009   (JP) ................ 2009-004974

(51) Int. Cl.
*G02B 27/10*   (2006.01)
*G02B 7/00*    (2006.01)
(52) U.S. Cl. ........................ 359/619; 359/642
(58) Field of Classification Search .......... 359/619–626, 359/694–704, 811–823, 642
See application file for complete search history.

(56) References Cited

U.S. PATENT DOCUMENTS

| 5,444,520 A * | 8/1995 | Murano ................ 399/221 |
| 7,245,435 B2 * | 7/2007 | Morishita et al. ............ 359/619 |

FOREIGN PATENT DOCUMENTS

| JP | 05-249407 A | 9/1993 |
| JP | 2002-210771 A | 7/2002 |
| JP | 2003-202411 A | 7/2003 |
| JP | 2008-083576 A | 4/2008 |
| JP | 2008-092006 A | 4/2008 |

* cited by examiner

*Primary Examiner* — Mohammed Hasan
(74) *Attorney, Agent, or Firm* — Rabin & Berdo, P.C.

(57) ABSTRACT

A lens array forms an erect image of an object. The lens array includes at least one row of lens elements and at least one rib. The lens elements are aligned in a first direction perpendicular to optical axes of the lens elements having an incidence surface and an exit surface. The rib is formed on the lens array and extending in a second direction parallel to the first direction and in a third direction parallel to the optical axes further than the incidence surface and the exit surface. A lens unit includes a shielding member and the lens array assembled to the shielding member. The shielding member includes diaphragms formed therein and aligned in a first direction, and a first engagement portion. The lens array includes a second engagement portion for engaging the first engagement portion to correct deformation of the lens array.

28 Claims, 10 Drawing Sheets

LENS ARRAY, LENS UNIT, LED HEAD, EXPOSING UNIT, IMAGE FORMING APPARATUS, AND IMAGE READING APPARATUS

BACKGROUND OF THE INVENTION

Field of the Invention

The present invention relates to a lens array, a lens unit, an LED head, an exposing unit, an image forming apparatus, and an image reading apparatus.

Electrophotographic image forming apparatuses, scanners, and facsimile machines incorporate an optical system capable of forming the erect image of an object having an equal size to the object. For electrophotographic printers, the optical system forms the erect image of light emitting diodes (LEDs) having an equal size to the LEDs, the light emitting diodes being aligned in a straight line, the erect image having an equal size to the object. For scanners and facsimile machines, the optical system forms the erect image of an original document. Such an optical system uses a lens array. A conventional lens array is a group of lenses aligned in a straight line, and forms an erect image of an object, the erect image having an equal size to the object. Some lens arrays are formed by injection molding, effectively reducing the number of parts (see Japanese Patent Application Laid-Open No. 2008-92006, paragraphs [0032] to [0039] and FIG. 1).

However, if a lens array is injection molded, the molded work is usually extracted by ejector pins. Such extraction is apt to result in wave-like surfaces of the molded lens array. The molded lens array longitudinally extends in a direction in which the lenses are aligned, leading to the warpage of the lens array due to the differences in contraction between thin portions and thick portions of the lens array.

SUMMARY OF THE INVENTION

The present invention was made in view of the aforementioned drawbacks.

An object of the invention is to prevent wave-like surface and warpage of an injection molded lens array.

A lens array forms an erect image of an object. The lens array includes at least one row of lens elements and at least one rib. The lens elements are aligned substantially in a first direction perpendicular to optical axes of the lens elements having an incidence surface and an exit surface. The rib is formed on the lens array and extending in a second direction substantially parallel to the first direction and in a third direction substantially parallel to the optical axes further than the incidence surface and the exit surface. A lens unit includes a shielding member and the lens array assembled to the shielding member. The shielding member includes diaphragms formed therein and aligned in a first direction, and a first engagement portion. The lens array includes a second engagement portion for engaging the first engagement portion to correct deformation of the lens array.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

A lens array, lens unit, LED head, exposing unit, image forming apparatus, and image reading apparatus of the present invention will be described in detail with reference to the accompanying drawings.

First Embodiment

Figure 1:
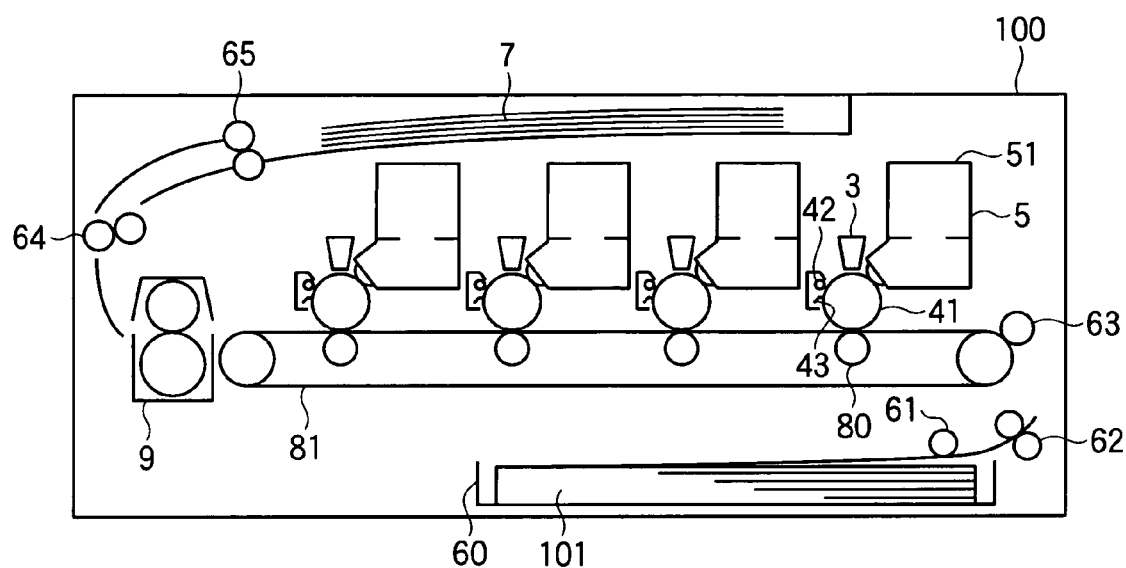
FIG. 1 illustrates the general configuration of a printer of a first embodiment.

FIG. 1 illustrates the general configuration of a printer of a first embodiment.

An image forming apparatus or a printer 100 of the first embodiment will be described with reference to FIG. 1. Referring to FIG. 1, the printer 100 prints an image on a medium in accordance with image data using toner formed of a resin containing a pigment therein. A paper cassette 60 holds a stack of media or paper 101 therein. A feed roller 61 feeds the paper 101 from the paper cassette 60 to transport rollers 62 and 63, which in turn transport the paper 101 in a transport path.

The printer 100 is an electrophotographic color printer, and includes print engines for forming a yellow image, a magenta image, a cyan image, and a black image, respectively. The print engines are aligned along the transport path of the paper 101. Each print engine includes a photoconductive drum 41 on which an electrostatic latent image is formed.

A charging roller 42, an LED head 3 (exposing unit), a developing unit 5, a transfer roller 80, and a cleaning blade 43 are disposed to surround the photoconductive drum 41. The charging roller 42 charges the surface of the photoconductive drum 41. The LED head 3 illuminates the charged surface of the photoconductive drum 41 to form an electrostatic latent image in accordance with the image data. The developing unit 5 supplies the toner to the electrostatic latent image, thereby developing the electrostatic latent image with toner to form a toner image. A toner cartridge 51 supplies the toner to the developing unit 5. The transfer roller 80 is disposed to parallel the photoconductive drum 41, sandwiching a transfer belt 81 along with the photoconductive drum 41. The cleaning blade 43 is in contact with the photoconductive drum 41 to scrape residual toner from the photoconductive drum 41 after transfer of the toner image onto the paper 101.

Power supplies (not shown) apply predetermined voltages to the charging roller 42 and transfer roller 80. The transfer belt 81, photoconductive drum 41, and the respective rollers are driven in rotation by motors (not shown) and gears (not shown). The developing unit 5, LED head 3, fixing unit 9, and respective motors (not shown) are connected to corresponding power supplies and controllers. A fixing unit 9 is disposed downstream of the transfer rollers. The paper 101 passes through the fixing unit 9 where the toner image on the paper 101 is fixed by heat and pressure. Then, the paper 101 further is transported by a transport roller 64, and is then discharged by a discharge roller 65 onto a stacker 7.

The printer 100 includes an external interface through which print data is received from an external apparatus, and prints an image on the paper 101 in accordance with the print data received through the external interface. The printer 100 of the aforementioned configuration includes a memory that stores control programs, and a controlling means and an arithmetic operation means that perform overall control of the printer 100.

Figure 2:
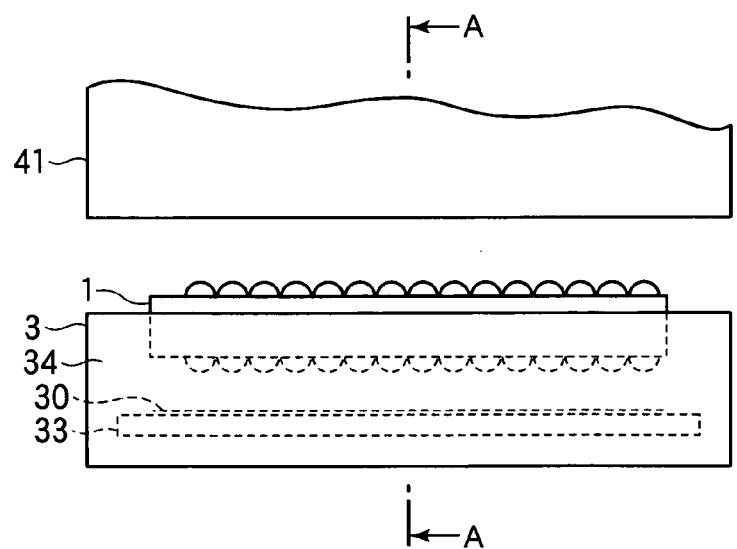
FIG. 2 illustrates the configuration of the LED head.

FIG. 2 illustrates the configuration of the LED head 3. The configuration of the LED head 3 will be described with reference to FIG. 2.

A lens unit 1 is fixed to the LED head 3 by means of a holder 34. Light emitting elements or a plurality of light emitting diodes (LEDs) 30 are aligned in a straight line on a printed circuit board 33.

Figure 3:
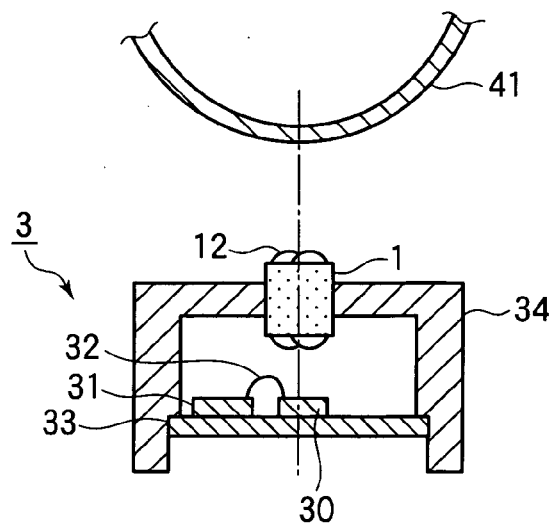
FIG. 3 is a cross-sectional view of the LED head 3 of the first embodiment taken along a line A-A of FIG. 2.

The lens unit 1 extends in its longitudinal direction in a direction in which the LEDs 30 are aligned. The lens unit 1 parallels the photoconductive drum 41, and the lens unit 1 forms an electrostatic latent image in accordance with the print data. The optical axes of microlenses of the lens unit 1 lie in a plane in which the LEDs 30 and the rotational axis of the photoconductive drum lie. FIG. 3 is a cross-sectional view of the LED head 3 of the first embodiment taken along a line A-A of FIG. 2.

Figure 13:
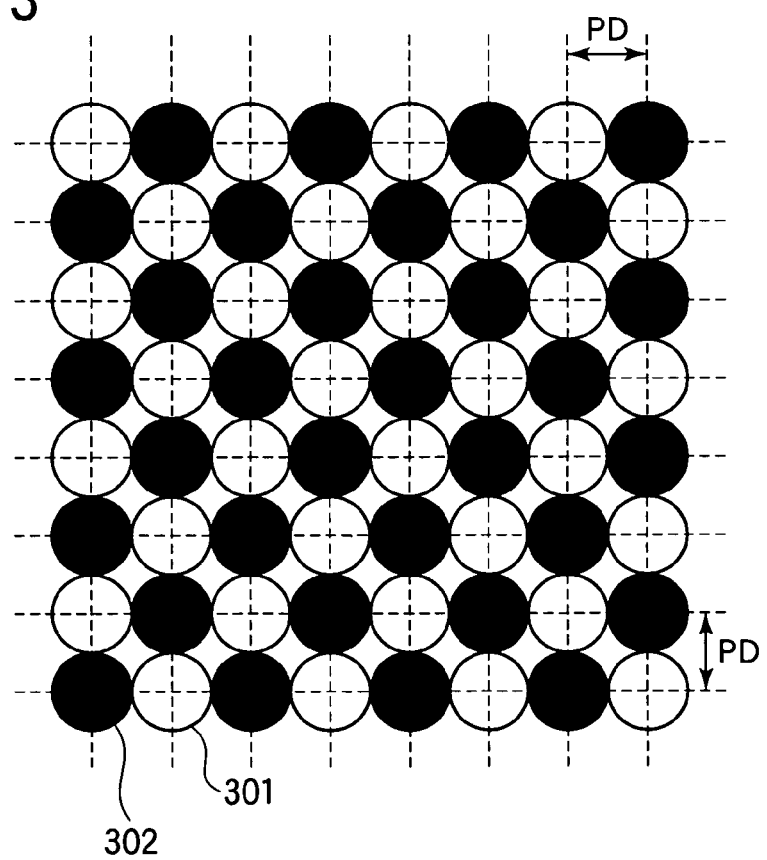
FIG. 13 illustrates printed dots and non-printed dots.

Referring to FIG. 3, the LEDs 30 and driver IC 31 are mounted on the printed circuit board 33, and are electrically connected to one another by means of wires 32. The LEDs 30 are driven by drive signals from the driver IC 31 to emit light. The LEDs 30 are aligned in a straight line at intervals of PD mm (FIG. 13).

The lens unit 1 forms the images of the LEDs 30 on the photoconductive drum 41, thereby forming an electrostatic latent image on the photoconductive drum 41 as the photoconductive drum 41 rotates. The LED head 3 has a resolution of 600 dots per inch (dpi), i.e., 600 LEDs are disposed per inch (approximately 25.4 mm) at 0.0423 mm intervals.

Figure 4:
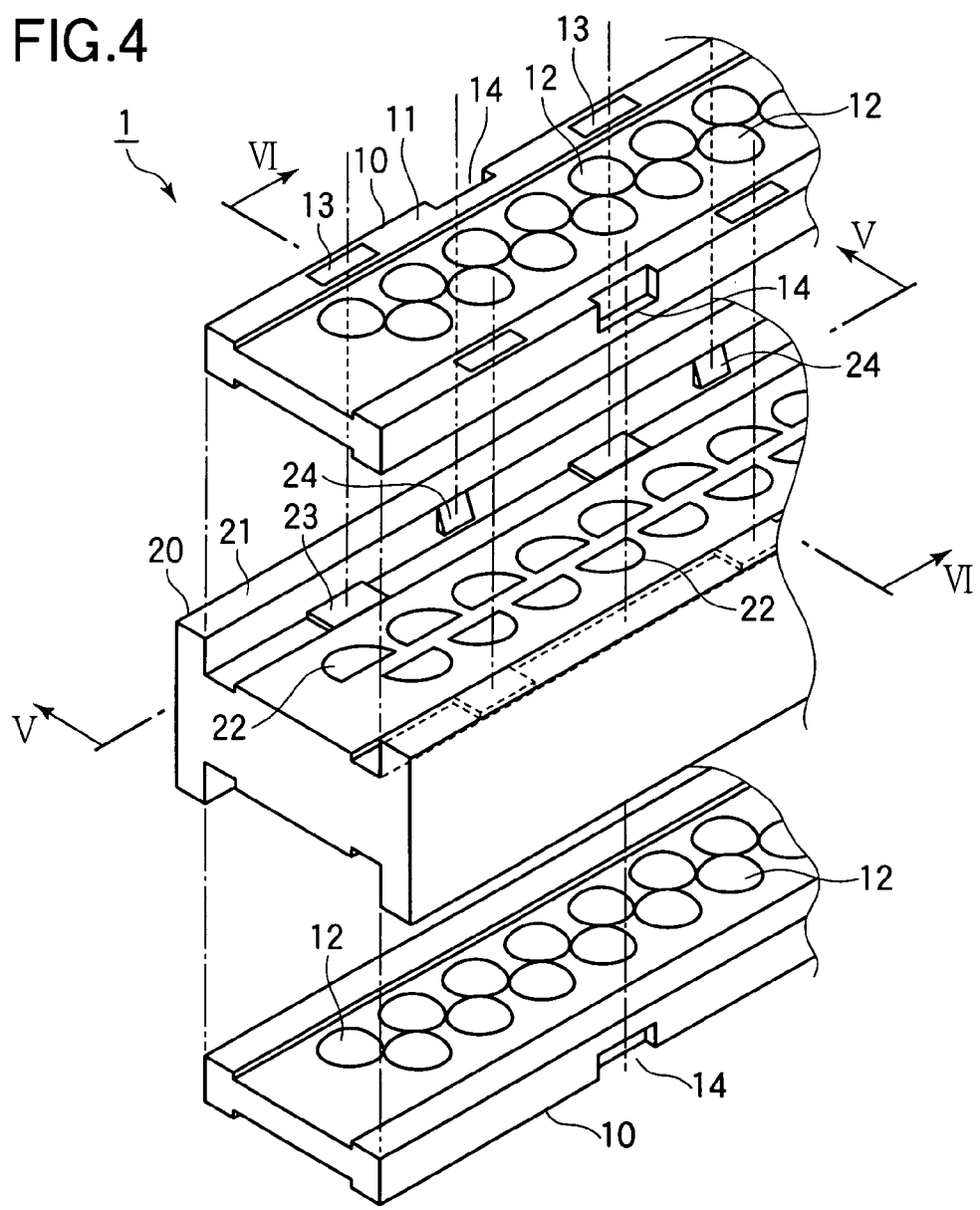
FIG. 4 is an exploded perspective view of the lens array 1 of the first embodiment.

FIG. 4 is an exploded perspective view of the lens array 1 of the first embodiment. The configuration of the lens unit 1 will be described with reference to FIG. 4. Referring to FIG. 4, the lens unit 1 includes two lens arrays 10 and a light shielding member 20. Each of the lens array 10 includes two parallel rows of microlenses 12 arranged such that a microlens in one of the two rows is between adjacent microlenses 12 in the other. Two lens arrays 10 extend in parallel to each other. The microlenses 12 in the two lens arrays 10 are aligned at equal intervals in directions (first direction) perpendicular to the optical axes such that the optical axes of the microlenses 12 in one of the two lens arrays 10 are in line with those of the microlenses 12 in the other. In other words, the two lens arrays 10 extend in directions perpendicular to their optical axes. The lens arrays 10 are formed of an optically transmissive material that allows the light emitted from the LEDs 30 to pass therethrough.

The shielding member 20 has through-holes 22 formed therein such that the optical axes the microlenses of the two lens arrays pass through substantially the centers of corresponding through-holes 22. The through-holes serve as a stop or diaphragm. The through-holes 22 are disposed at the same intervals as the microlenses 12 of the lens arrays 10. The through-holes 22 are aligned in directions substantially perpendicular to the optical axes of the lens arrays.

The lens array 10 has ribs 11 formed to extend in directions (second direction) parallel to the two rows of the microlenses 12 with the two rows of the microlenses 12 disposed between the ribs 11. The ribs 11 include impressed recesses 13 resulted when ejector pins 204 (FIG. 12) push the lens array 10 out of a mold during injection molding, and recesses 14 into which part of the shielding member 20 engages when the lens array 10 is assembled to the shielding member 20. The impressed recesses 13 are rectangular but are not limited to a rectangular shape.

The shielding member 20 has ribs 21 formed on both sides of the row of the through-holes. The ribs 21 have hooks 24 that are effective in correcting the deformation (e.g., warpage) and wave-like surfaces of the lens array 10. Upon engagement of the hooks 24 with the recesses 14, positioning portions 23 abut part of the lens array 10, thereby positioning the lens array 10 in the directions of the optical axis of the microlenses 12 and allowing the shielding member 20 to hold the lens arrays 10.

Figure 5A:
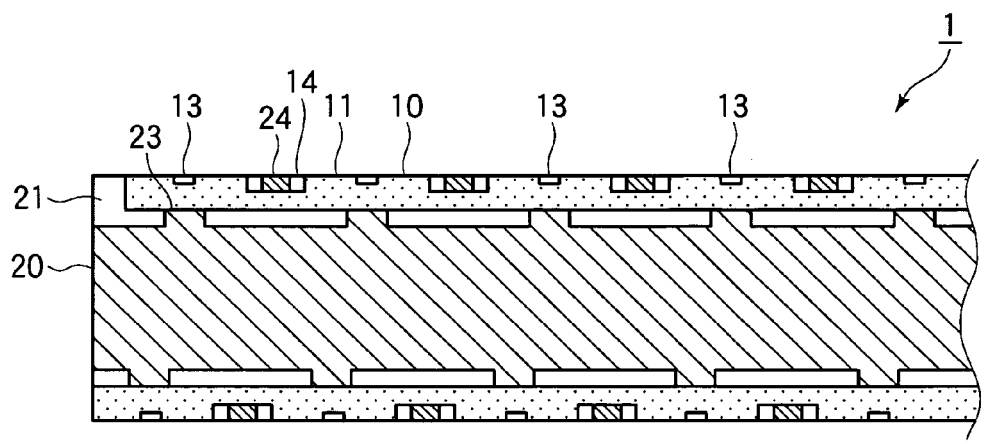
FIG. 5A is a general view of the lens unit 1.
Figure 5B:
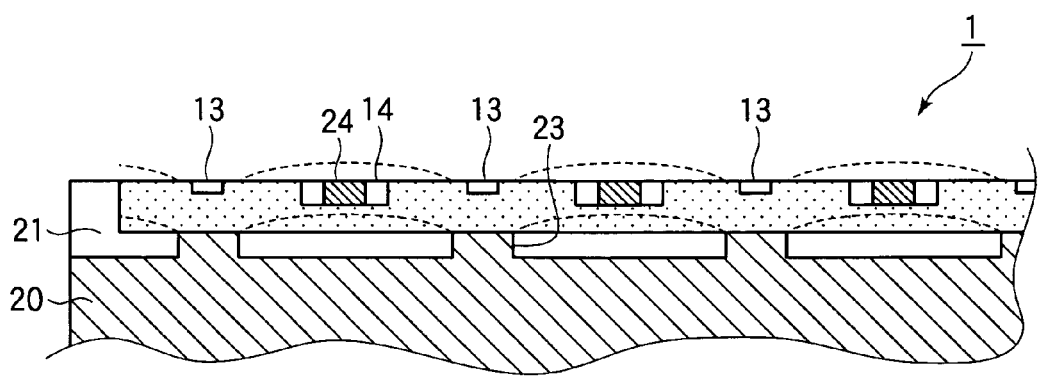
FIG. 5B illustrates the vicinity of the positioning portions, hooks, impressed recesses, and recesses.

FIGS. 5A and 5B are a cross-sectional view of the lens unit 1 of the first embodiment taken along a line V-V of FIG. 4. The microlenses 12 (not shown) are aligned from left to right in FIGS. 5A and 5B. FIG. 5A is a general view of the lens unit 1 and FIG. 5B illustrates the vicinity of the positioning portions 23, hooks 24, impressed recesses 13, and recesses 14.

Referring to FIG. 5A, the positioning portions 23 are in the vicinity of the impressed recesses 13, and the hooks 24 and recesses 14 are positioned substantially in the middle between adjacent positioning portions 23. The hooks 24 cause the positioning portions 23 to abut part of the lens array 10, thereby positioning the lens array 10 in the direction parallel to the optical axes of the microlenses 12 and correcting or straightening the wave-like surface of the lens array 10.

FIG. 5B illustrates the lens array 10 having a wave-like surface (illustrated in dotted lines) resulting from injection molding. A portion of the surface between the adjacent impressed recesses 13 is a ridge and portions at the impressed recesses 13 are valleys. Upon assembly of the lens array 10, the valleys of the wave-like surface of the lens array 10 abuts the positioning portions 23 of the shielding member 20 while the ridges abut the hooks 24, thereby correcting the wave-like surface.

Figure 6:
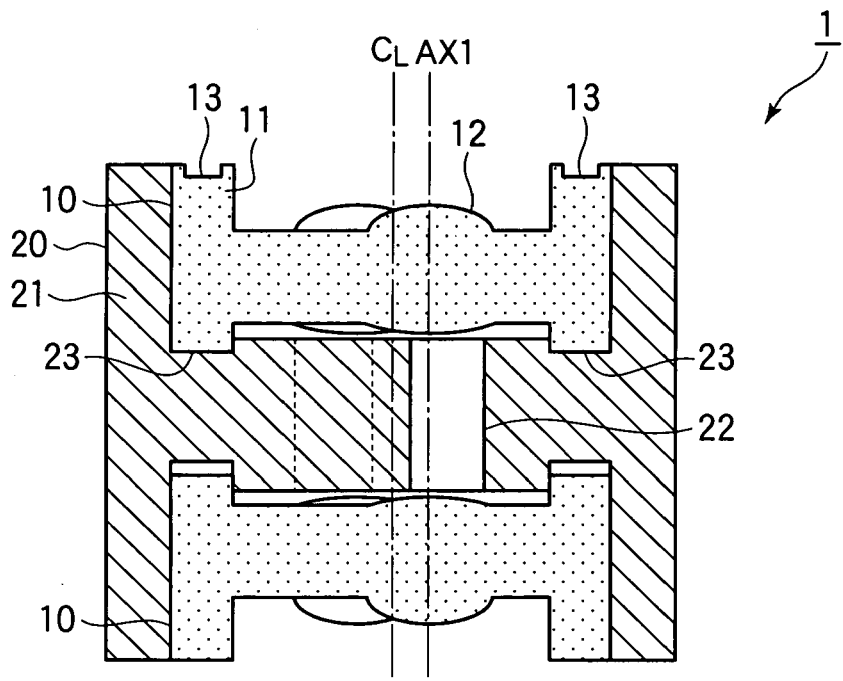
FIG. 6 is a cross-sectional view of the impressed recesses in the lens unit taken along a line VI-VI of FIG. 4.

FIG. 6 is a cross-sectional view of the impressed recesses 13 in the lens unit 1 taken along a line VI-VI of FIG. 4. Reference $C_L$ denotes the center line of the lens unit 1. The optical axes AX1 of the microlenses 12 in one of the two lens arrays 10 are in line with those AX1 of the microlenses 12 in the other, and pass through the centers of the corresponding through-holes 22. The lens array 10 abuts the positioning portions 23 in the vicinity of the impressed recesses 13, thereby positioning the lens array 10 in the direction of the optical axis AX1.

The ribs 11 are formed to extend in directions (third direction) parallel to the optical axes of the microlenses 12 further than the light incident surface of the microlenses 12 and further than exit surfaces of the microlenses. The ribs 11 serve to minimize the warpage of the lens array 10 caused during the manufacturing process.

Figure 7:
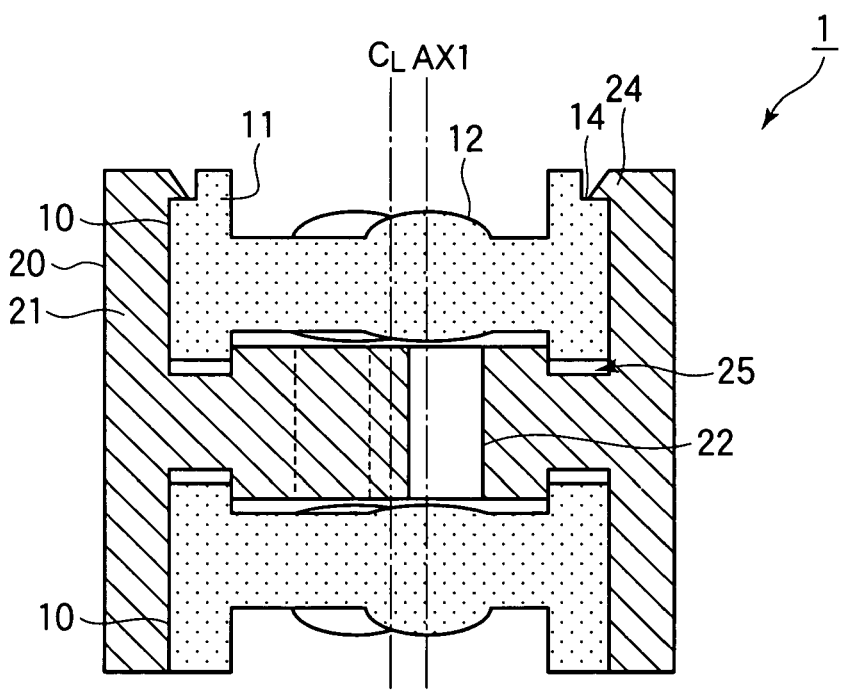
FIG. 7 is a cross-sectional view of the lens unit in a plane perpendicular to the row of the microlenses passing through the hook.

FIG. 7 is a cross-sectional view of the lens unit 1 in a plane perpendicular to the row of the microlenses 12 passing through the hook 24.

The lens array 10 is assembled to the shielding member 20 such that the hooks 24 of the shielding member 20 engage the recesses 14 formed in the lens array 10, the shielding member firmly holding the lens array 10. The shielding member 20 is in contact with the lens array 10 only at the positioning portions 23, thereby minimizing the interference of the shielding member 20 with the lens array 10.

Figure 8:
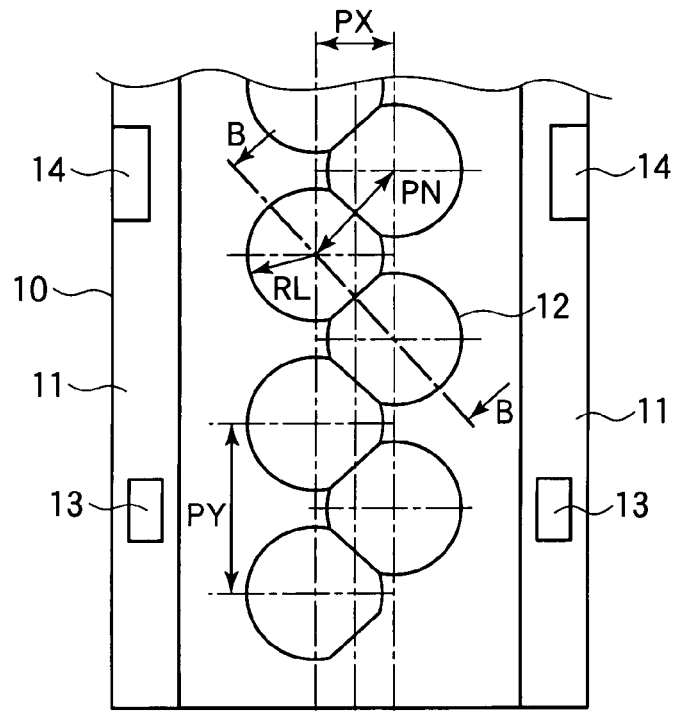
FIG. 8 is a top view of the lens array.

FIG. 8 is a top view of the lens array 10. Referring to FIG. 8, the ribs 11 extend in directions substantially parallel to the rows of the microlenses 12. Each rib 11 has the impressed recesses 13 and recesses 14 in its top surface. The lens array 10 includes two rows of microlenses 12 arranged into an overlapping nested configuration in which each microlens 22 in one of the two rows extends into adjacent two microlenses 22 in the other of the two rows with their surfaces in intimate contact with each other. The microlenses 22 in each row are aligned such that the optical axes of adjacent microlenses are spaced apart by a distance PY. The optical axes of the microlenses 22 of each row lie in one of two parallel planes P1 and P2 spaced apart by a distance PX.

The two rows of the microlenses 12 and the row of the plurality of LEDs 30 are parallel to one another. The two rows of the microlenses 12 are substantially the same distance from the row of the LEDs 30. Each microlens 12 has a lens surface with a circumferential perimeter of a radius RL, partially cut away in a plane parallel to the optical axis. The two rows of the microlenses 12 are arranged such that the center-to-center distance between a microlens 12 in one of the two rows and an adjacent microlens 12 in the other is PN. The lens array 10 is formed of a material that allows the light emitted from the LEDs 30 to pass therethrough.

The lens array 10 of the first embodiment is injection-molded from an optical resin which is a cycloolefin-based resin (ZEONEX E48R (registered trademark), available from JAPAN ZEON), thereby providing a plurality of microlenses 12 formed in one piece construction. The microlens 12 has a polynomial aspheric surface expressed by Equation (1) as follows:

$$Z(r) = \frac{\frac{r^2}{C}}{1 + \sqrt{1 - (1+k)\left(\frac{r}{C}\right)^2}} + \sum_{n=2}^{m} A_{2n} r^{2n} \qquad \text{Eq. (1)}$$

where $Z(r)$ is a rotating coordinate system having a radius r and an axis in line with the optical axis of the microlens 12, $\bar{r}$ is a radius given by Equation (2) in terms of X ordinate and $\bar{Y}$ ordinate, k is a conic constant, C is a radius of curvature, A is an aspheric coefficient, and m and n are positive integers.

$$r = \sqrt{X^2 + Y^2} \qquad \text{Eq. (2)}$$

Figure 9:
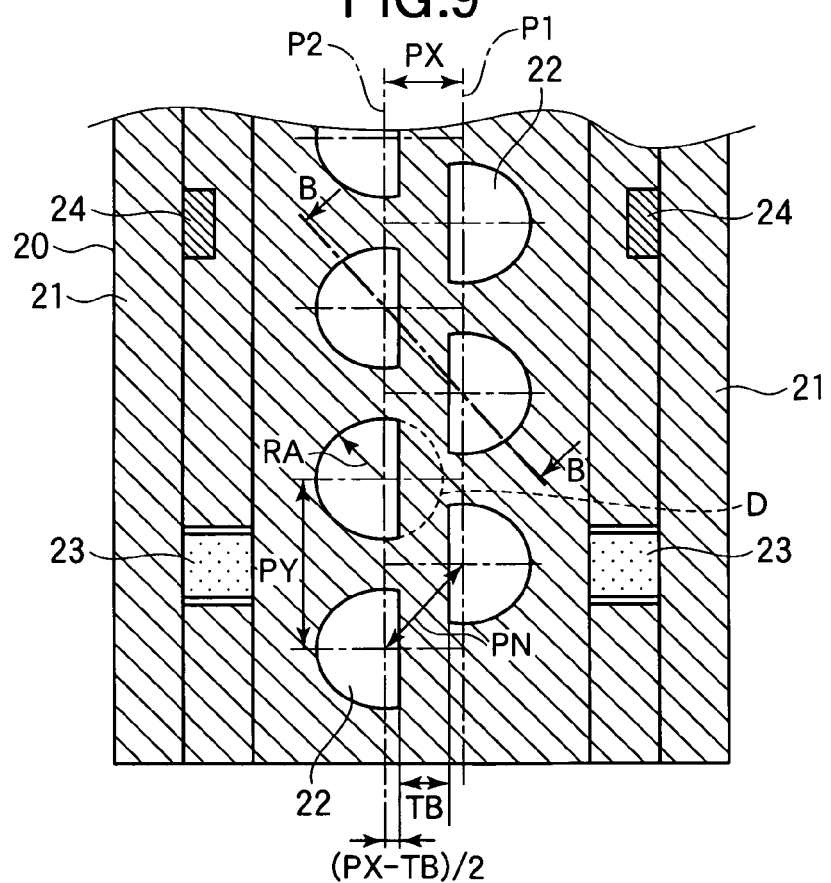
FIG. 9 is a top view of the shielding member of the first embodiment.

FIG. 9 is a top view of the shielding member 20 of the first embodiment.

Referring to FIG. 9, the shielding member 20 has two longitudinally extending ribs 21 formed thereon and two rows of apertures 22 located between the two ribs 21. The shielding member 20 further includes positioning portions 23 extending in directions (perpendicular to the page) parallel to the direction in which the axes of the through-holes 22 extend. The hooks 24 are formed on the two ribs 21 such that hooks on one of the two ribs 21 extend toward those on the other of the two ribs 21. That is, the hooks 24 extend in directions substantially perpendicular to the rows of the through-holes.

The through-holes 22 of the shielding member 20 have a substantially semicircular cross section such that through-holes 22 in each row are spaced apart by a center-to-center distance PY and the optical axes of the microlenses 12 pass through the centers of imaginary circles D in which the corresponding through-holes 22 fit. The centers of the imaginary circles D and the optical axes of the microlenses 12 are in line with one another and lie in planes P1 and P2 spaced apart by the distance PX. The imaginary circles D have a radius RA smaller than that of the microlenses 12. The two rows of the through-holes 22 are arranged such that the center-to-center distance between an imaginary circle D in one of the two rows and an adjacent imaginary circle in the other is PN. The through-holes 22 have a semi-cylindrical inner wall and a flat inner wall that are contiguous, and are aligned such that the flat inner walls of the through-holes 22 in one of the two rows lie in one of two parallel planes P3 and P4 and the flat inner walls of the through-holes 22 in the other of the two rows lie in the other of two parallel planes. The two parallel planes are spaced apart by a distance TB. The distance between the plane P1 and P3 is (PX−TB)/2. The distance between the plane P2 and P4 is (PX−TB)/2.

The shielding member 20 is formed of a material that prevents the light emitted from the LEDs 30 from passing therethrough.

Figure 10:
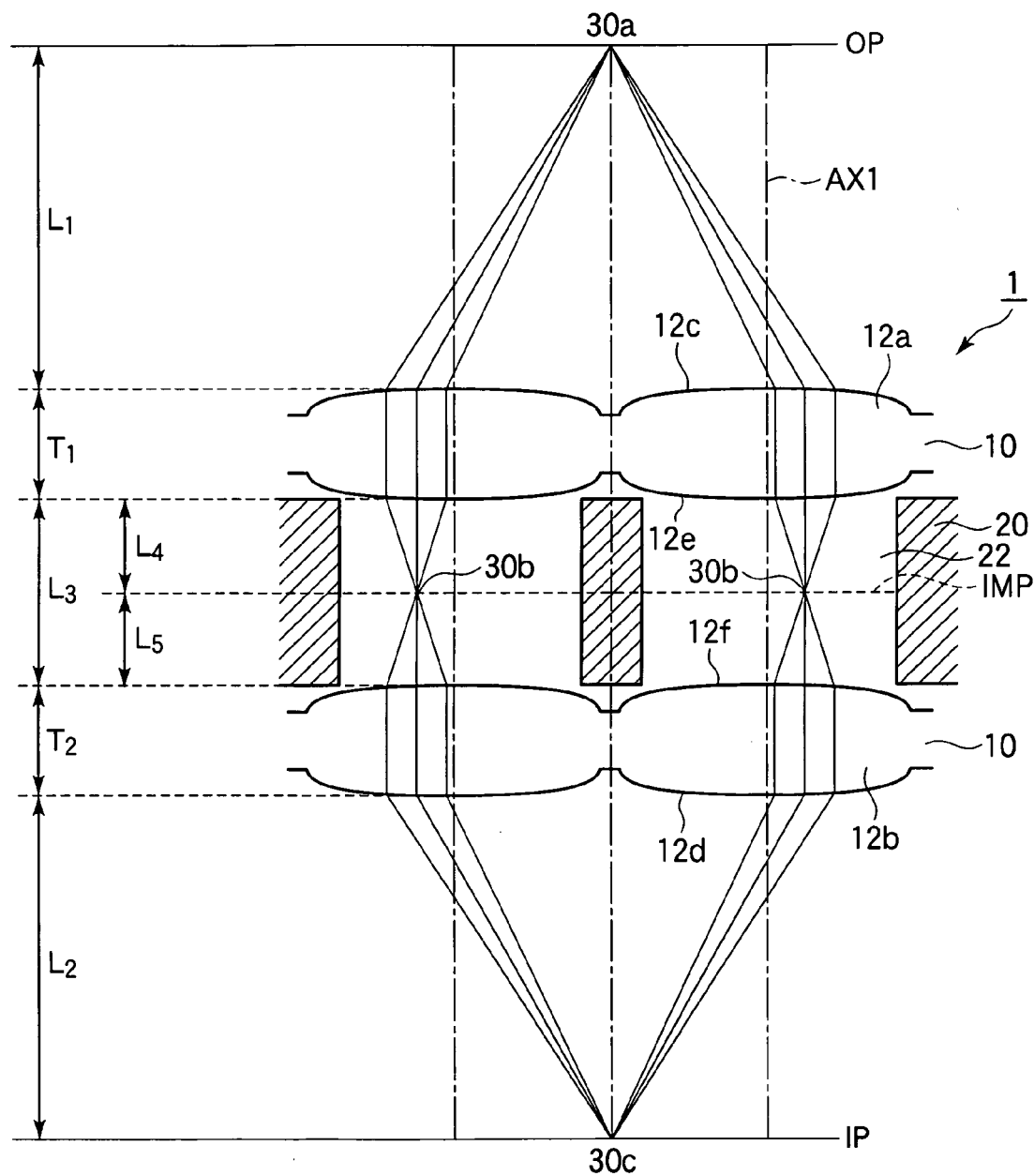
FIG. 10 is a partial cross-sectional view of the lens unit 1 taken along lines B-B of FIGS. 8 and 9.

The shielding member 20 is injection-molded from polycarbonate. FIG. 10 is a partial cross-sectional view of the lens unit 1 taken along lines B-B of FIGS. 8 and 9. The lens unit 1 will be described in detail with reference to FIG. 10.

Referring to FIG. 10, a microlens 12a on the object side is disposed such that a surface 12c of the microlens 12a is a distance $L_1$ from a plane in which LEDs are disposed. A microlens 12b on the image plane side is disposed such that the surface 12d of the microlens 12b is a distance $L_2$ from a plane in which the images of the LEDs are formed. The microlenses 12a and 12b are spaced such that the surface 12e of the microlens 12a and the surface 12f of the microlens 12b are spaced apart by a distance $L_3$. The microlens 12a has a thickness of $T_1$ and the microlens 12b has a thickness of $T_2$. The microlens 12a forms an inverted image 30b of an LED 30a in an intermediate image plane IMP.

The microlens 12b forms the image 30c in an image plane IP (i.e., the surface of the photoconductive drum). The lens unit 1 is disposed between the LEDs 30 and the photoconductive drum 41 such that the distance $L_1$ is equal to the distance $L_2$. The intermediate image plane IMP is substantially midway between the surfaces 12e and 12f.

While the two lens arrays 10 have different configuration (e.g., different thickness), these lens arrays 10 may have the same configurations, in which case, the microlenses 12a and 12b have the same thickness (e.g., $T_1=T_2$), the distance $L_1$ is equal to the distance $L_2$, and a distance $L_4$ is equal to a distance $L_5$.

The microlenses 12a and 12b are oriented in a back-to-back relation such that one microlens is the conjugate of the other with respect to the intermediate image plane IMP, and form an erect image of the same size as LEDs 30 on the image plane IP.

The shielding member 20 prevents ambient light from entering the optical system constructed of the two lens arrays 10, and prevents the light inside of the optical system from exiting outside of the optical system.

{Operation of Printer}

The operation of the printer 100 incorporating the aforementioned optical system will be described with reference to FIG. 1.

A power supply (not shown) applies a high voltage to the charging roller 42, which in turn charges the surface of the photoconductive drum 41. As the photoconductive drum 41 rotates, the charged surface rotates past the LED head 3, which in turn illuminates the charged surface in accordance with the image data to form an electrostatic latent image. The developing unit 5 develops the electrostatic latent image with toner into a toner image.

The feed roller 61 feeds the print paper 101 from the paper cassette 60 into the transport path. Then, the transport rollers 62 and 63 further transport the print paper 101 toward the transfer roller 80 and transfer belt 81. When the photoconductive drum 41 further rotates and the toner image on the photoconductive drum 41 approaches a transfer point defined by the photoconductive drum 41 and transfer belt 81, a power supply applies the high voltage to the transfer roller 80 to transfer the toner image onto the print paper 101.

The print paper 101 carrying the toner image thereon is further transported by the transfer belt 81 to the fixing unit 9, which in turn fuses the toner image on the paper 101 by heat and pressure into a full color image. The print paper 101 is then discharged onto the stacker 7 by the transport roller 64 and the discharge roller 65. This completes printing.

{Operation of LED Head}

The operation of the LED head 3 will be described with reference to FIG. 3. The controller of the printer 100 outputs control signals to the LED head 3 in accordance with the image data. The driver IC 31 controls the LEDs 30 to emit light in accordance with the control signals and the image data, the light having a predetermined amount of light. The light emitted from the LEDs 30 enters the lens unit 1, which in turn forms images of the LEDs 30 on the photoconductive drum 41.

{Operation of Lens Unit}

The operation of the lens unit 1 will be described with reference to FIG. 10. The light emitted from the LEDs 30 enters the microlens 12a which in turn forms intermediate images (inverted images) 30b of the LEDs 30 in the intermediate image plane IMP. The microlens 12b forms the images 30c on the surface of the photoconductive drum 41. The images 30c are erect images of the LEDs 30 having an equal size to the LEDs 30.

The intermediate images 30b are inverted images having a size smaller than the LEDs 30. The images 30c are expanded erect images of the intermediate images 30b. The light is telecentric between the microlenses 12a and microlens 12b, where principal rays from the LEDs are parallel.

In this manner, the lens unit 1 forms an erect image of the LEDs 30 having an equal size to the LEDs. The shielding member 20 shields the light emitted from the LEDs 30 that exits the microlens 12a but does not contribute to image formation. The lens unit 1 will also form an erect image even if the microlens 12a and microlens 12b have different configurations.

FIGS. 11A-11D illustrate the wave-like surface of the lens array 10 resulting from the injection molding process.

Referring to FIGS. 11A-11D, a mold 200 includes a lower mold part 201 and an upper mold part 202, and is used to form the lens array 10 by injection molding. The lower mold part 201 and upper mold part 202 are clamped together to form a cavity 203 that conforms to the shape of a finished lens array 10. When the lens array 10 is released from the mold 200, the lower mold part 201 remains fixed and the upper mold part 202 moves relative to the lower mold part 201. The ejector pins 204 (突き出しピン) push up the molded lens array 10 to release the molded lens array 10 from the lower mold part 201.

Figure 11A:
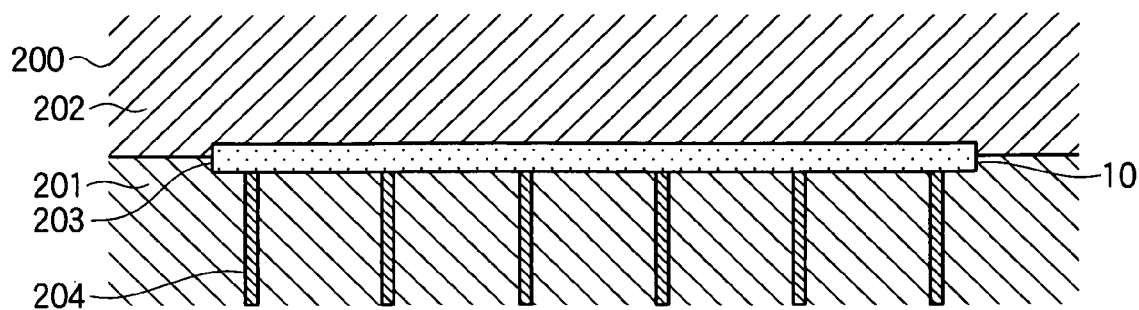
FIGS. 11A-11D illustrate the wave-like surface of the lens array 10 resulting from the injection molding process.

The ejector pins 204 are provided at predetermined intervals at positions where the ejector pins 204 face the positioning portions 23 of the shielding member 20 such that the impressed recesses 13 is in line with the positioning portions 23, i.e., the impressed recesses 13 and positioning portions 23 lie in a direction in which the ejector pins 204 push the lens array 10. Referring to FIG. 11A, the upper mold part 202 and lower mold part 201 are clamped together and a resin material melted by heat is injected into the cavity of the mold 200.

Figure 11B:
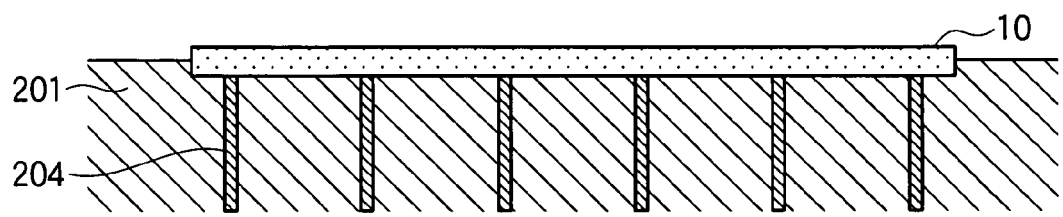
Figure 11C:
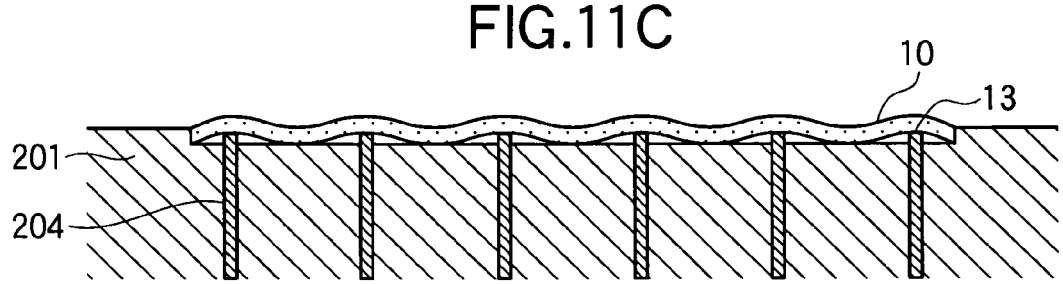
Figure 11D:
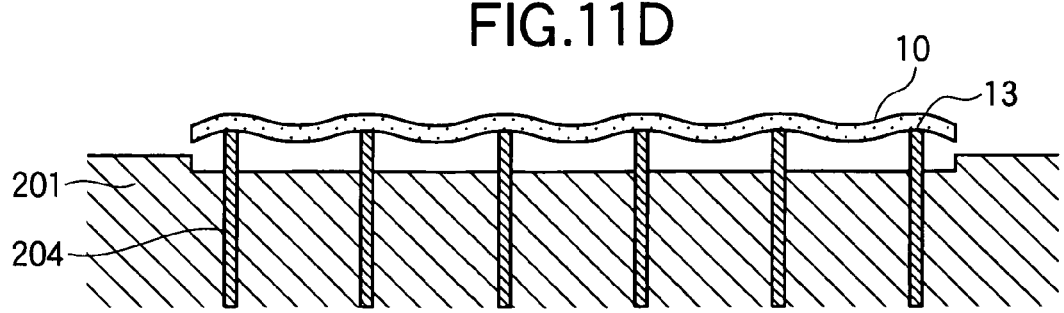

Referring to FIG. 11B, the upper mold part 202 is unclamped from the lower mold part 201, thereby preparing for release of the molded lens array from the mold 200. Referring to FIG. 11C, the ejector pins 204 are moved upward to push the lens array 10 out of the lower mold part 201, thereby releasing the lens array 10 from the mold 200.

When the lens array 10 is released from the mold 200, the impressed recesses 13 are formed. However, if the lens array 10 is intimate contact with the lower mold part 201, parts of the lens array 10 in the vicinity of the ejector pins 204 leaves the lower mold part 201 but the remaining portions of the lens array 10 are difficult to leave the lower mold part 201. This causes wave-like deformation of the lens array 10.

The positioning portions 23 and hooks 24 are formed such that when the lens array 10 has been assembled to the shielding member 20, the positioning portions 23 are in line with the impressed recesses 13 while the hook 24 is substantially midway between adjacent two positioning portions 23. Thus, the positioning portions 23 and hooks 24 cooperate with each other to correct the wave-like surface of the lens array 10, ensuring the sufficient dimensional accuracy of the lens array 10 for desired optical performance.

{Warpage of Lens Array}

Figure 12A:
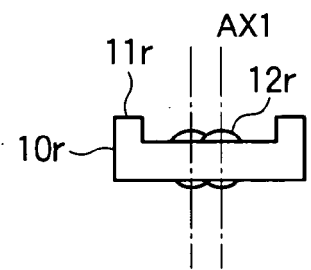
FIG. 12A is a side view of a lens array not according to the present invention as seen from one longitudinal end of the lens array.
Figure 12B:
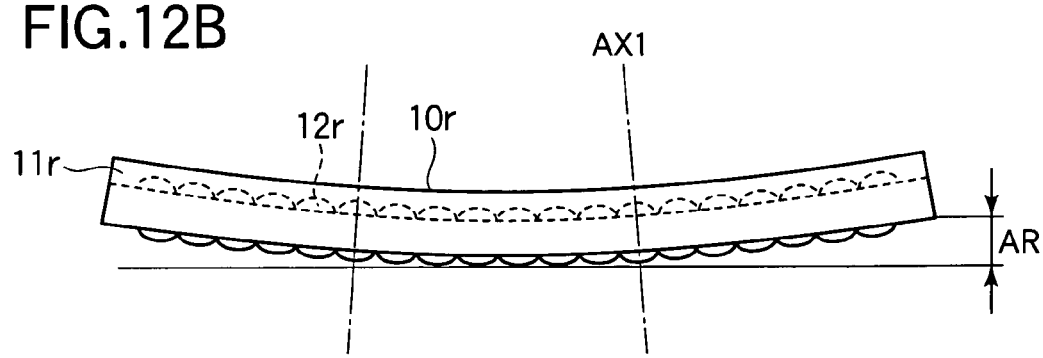
FIG. 12B is a front view of the lens array of FIG. 12A in which the two substantially straight rows of microlenses 12r extend from left to right in FIG. 12B.

FIG. 12A is a side view of the lens array 10r as seen from one longitudinal end of the lens array 10r. FIG. 12B is a front view of the lens array 10r in which the two substantially straight rows of microlenses 12r extend from left to right in FIG. 12B.

The warpage of the lens array 10 will be described by way of a lens array 10r different from the present invention. Referring to FIG. 12B, two substantially straight rows of microlenses extend in a longitudinal direction of the lens array 10r, and the lens array 10r has ribs 11r formed only on the incident side of the lens array 10r.

As is clear from FIG. 12B, the lens array 10r has a larger surface area on the upper side (incident side) than on the lower side (exit side). A difference in surface area causes large differences in contraction coefficient and expansion coefficient, resulting in warpage AR of the lens array 10r as shown in FIG. 12B.

In contrast, the lens array 10 of the present invention has substantially identical ribs 11 on both its incident side and exit side, so that the surface areas on the two sides are substantially the same and therefore the contraction coefficient and expansion coefficient on the two sides may be substantially the same. This leads to great reduction of warpage of the lens array 10, being advantageous in providing sufficient dimensional accuracy and desired optical performance of the lens array 10.

The modulation transfer function is a measure of the resolution of a formed image. Experiment shows that the LED head 3 incorporating the lens array 10 of the invention provides an MTF of greater than 80%. It can also be said that MTF indicates the resolution of the exposing unit and is also a measure of the contrast of the images of the LEDs 30 emitting light. Contrast is highest if an image has a MTF of 100%, which indicates that the exposing unit has a very high resolution. The smaller the MTF, the lower the contrast. A small MTF indicates that the exposing unit has a low resolution.

When dot images are formed in the image plane IP (FIG. 10), each dot image has a Gaussian distribution of intensity. The center portion of the dot image has a maximum intensity and a portion substantially midway between adjacent dot images has a minimum intensity.

MTF in percent is given as follows:

$$MTF = \frac{EMAX - EMIN}{EMAX + EMIN} \times 100\%$$

where EMAX is a maximum value of irradiance distribution of adjacent formed images and EMIN is a minimum value of irradiance distribution.

An experiment was conducted to measure the MTF of the LED head 3 as follows: A digital microscope camera was placed in an image plane IP of the LED head 3 and the images of the LEDs were captured. The captured images were analyzed to determine the distribution of the amount of light and the MTF was calculated based on the distribution.

The LED head 3 used in the experiment incorporates LEDs 30 aligned at intervals of PD=0.0423 mm.

{Relationship Between MTF and Image Quality}

The relationship between the MTF and image quality of the image forming apparatus will be described. Non-illuminated areas on the surface of the photoconductive drum 41 should have a sufficiently high potential. Also, the areas on the photoconductive drum 41 that are not illuminated by the LED head 3 should be sufficiently dark. However, if the MTF value is small, some amount of light may enter the areas that should be dark.

If unwanted light enters the areas on the photoconductive drum 41 that should not be illuminated by the LED head 3, a decrease in the potential of the areas is caused, resulting in unwanted adhesion of the toner to the areas. The areas on the paper 101 in which the toner is absent are the same color as the paper 101, e.g., white. Areas in which the wanted deposit of toner occurs may be perceived as a mixture of white and the color of the toner by human eyes.

A variety of evaluations were performed and it was concluded that when the MTF is equal to or larger than 80%, the printed image is free from white streaks and inconsistency in image density.

Subsequently, evaluation was made on the images printed by a color LED printer that incorporates the lens unit of the first embodiment. Images free from white streaks and inconsistency in density were obtained. FIG. 13 illustrates printed dots 301 and non-printed dots 302. Printing was performed such that every other dot shown in FIG. 13 is printed and their image quality was evaluated. The toner is present on dots (black) 301 while the toner is absent on dots (white) 302.

The microlens 12 of the first embodiment has a rotationally symmetric polynomial aspheric surface. The invention is not limited to this type of surface. The microlens 12 may have a spherical surface. Yet alternatively, the microlens may have a curved surface such as an anamorphic aspheric surface, a parabolic surface, an elliptical surface, a hyperboloid, or a conic surface. While the lens array 10 is formed by common injection molding, the lens array 10 may be formed by compression injection molding. Also, the lens array may be formed of glass instead of resin.

Although the shielding member 20 was molded from polycarbonate by injection molding, the shielding member 20 may also be made by machining or etching metal. The light source of the exposing unit of the first embodiment is an LED array in which a plurality of LEDs 30 are aligned, the light source may also be an organic EL, a semiconductor laser, or a combination of a shutter means implemented with a liquid crystal element with a fluorescent light or a halogen lamp.

Second Embodiment

Figure 14:
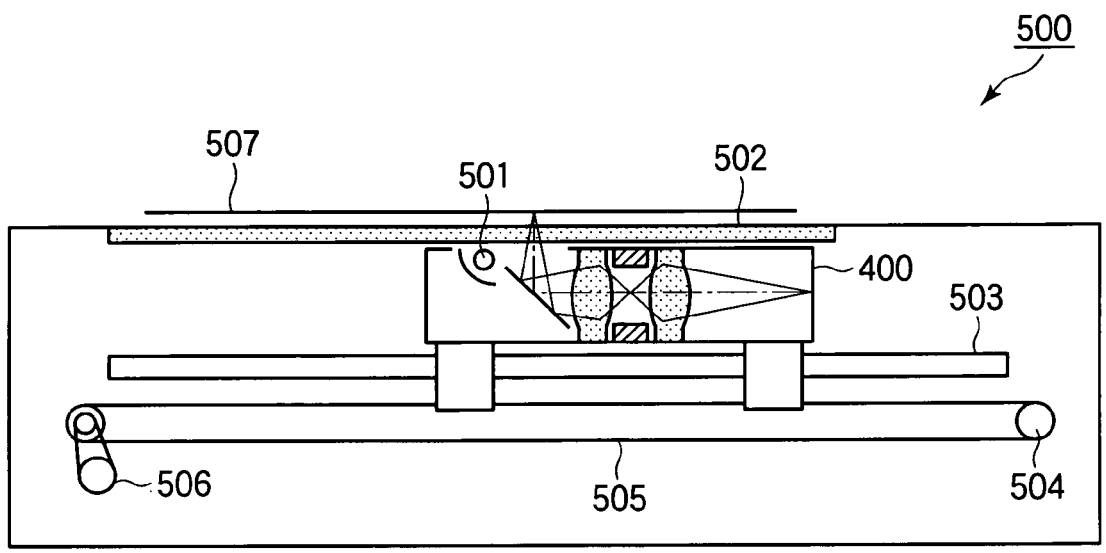
FIG. 14 illustrates the general configuration of an image reading apparatus of the second embodiment.

The lens unit of the first embodiment has been described as being used in an image forming apparatus. The lens unit of a second embodiment will be described in terms of a lens unit incorporated in an image reading apparatus. FIG. 14 illustrates the general configuration of an image reading apparatus of the second embodiment. Elements similar to those of the first embodiment have been given the same reference numerals, and their description is omitted.

The second embodiment will be described with reference to FIG. 14. Referring to FIG. 14, a scanner 500 reads the image of an original 507 and generates image data in the form of electronic data. The scanner 500 includes an image reading head 400, a lamp 501, a transparent platen 502, a rail 503, a drive belt 505, and a motor 506. The lamp 501 illuminates the surface of the original 507. The image reading head 400 receives the light reflected back from the surface of the original 507, and then converts the receive light into electronic data or image data.

The platen 502 is formed of a transparent material and supports the original 507 thereon. The image reading head 400 is movably supported on the rail 503 extending under the platen 502. The image reading head 400 is connected to the drive belt 505 disposed about a plurality of pulleys 504, so that when the motor 506 drives the drive belt 505 to run, the image reading head 400 runs on the rail 503 in a slidable manner.

Figure 15:
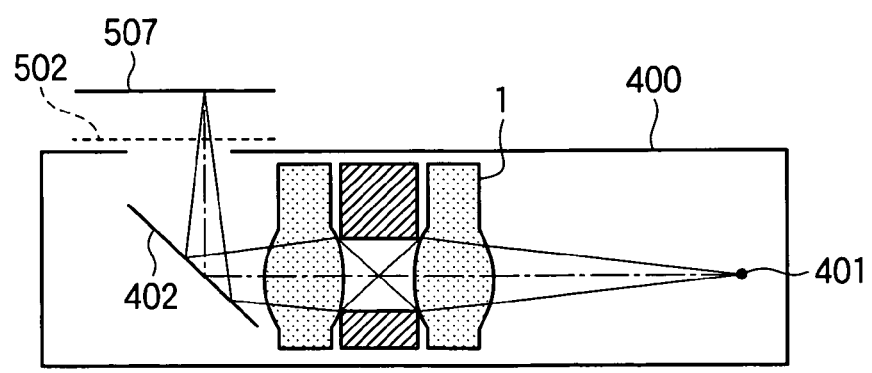
FIG. 15 illustrates the general configuration of the image reading head.

FIG. 15 illustrates the general configuration of the image reading head 400. The configuration of the image reading head 400 will be described with reference to FIG. 15. Referring to FIG. 15, the image reading head 400 includes a lens unit 1, a line sensor 401, and a mirror 402. The mirror 402 bends the path of the light reflected by the original 503, and guides the reflected light into the lens unit 1.

Figure 16:
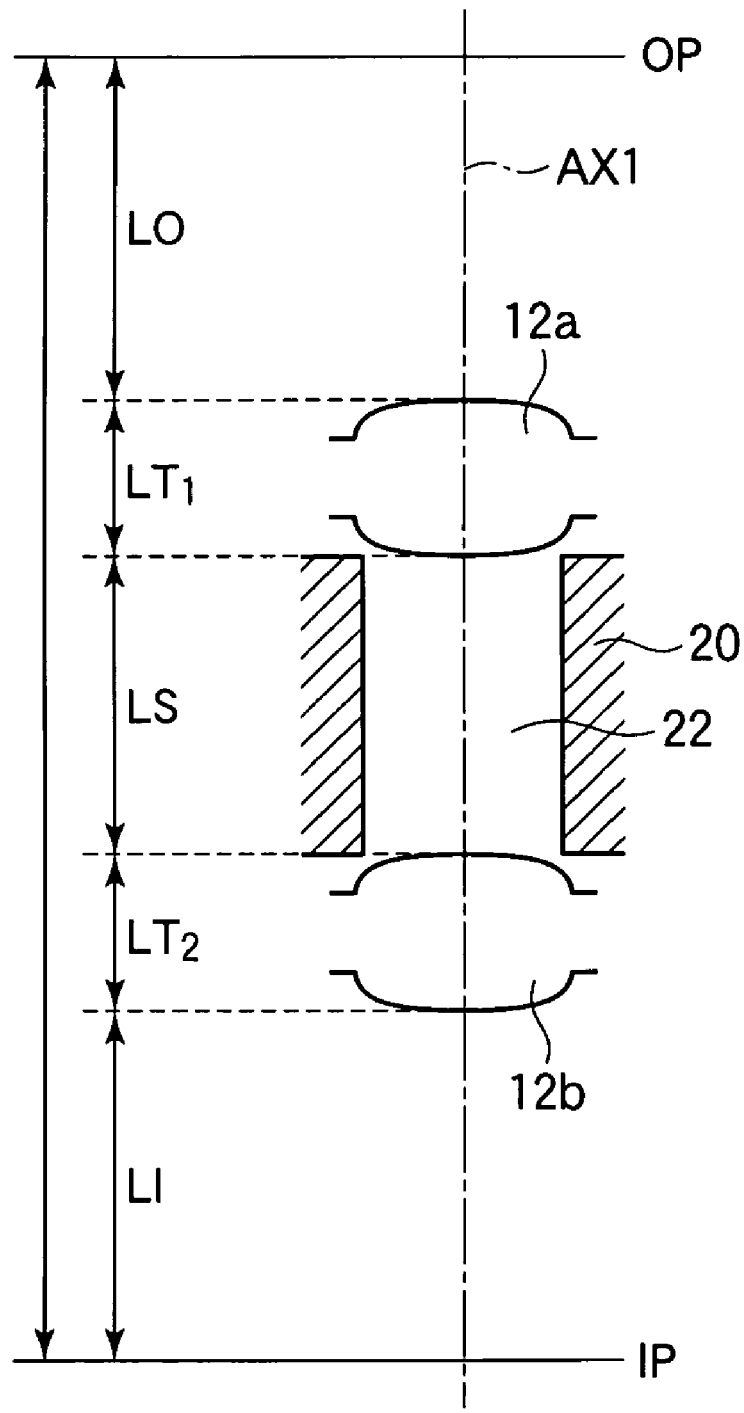
FIG. 16 illustrates the configuration of the image reading head and the relationship between an object (original) in an object plane OP and the image of the object in an image plane.

The line sensor 401 includes a plurality of light receiving elements aligned at intervals of PR in a straight line, and converts the image of the original formed by the lens unit 1 into an electrical signal. FIG. 16 illustrates the configuration of the image reading head 400 and the relationship between an object (original 507) in an object plane OP and the image of the object in an image plane IP. The lens unit 1 of the second embodiment has the same configuration as the first embodiment.

The line sensor 401 has a resolution of 600 dpi, i.e., 600 light receiving elements are disposed per inch. In other words, the light receiving elements are disposed at 0.0423 mm intervals. The operation of the image reading apparatus of the aforementioned configuration will be described with reference to FIG. 14.

When the lamp 501 turns on to illuminate the image surface of the original 507, the image reading head 400 receives the light reflected back from the original 507. The motor 506 drives the drive belt 505, thereby causing the image reading head 400 and lamp 501 to run in a left-to-right direction as viewed in FIG. 14, so that the image reading head 400 can capture the entire image of the original 507. The operation of the image reading head 400 will be described with reference to FIG. 15.

The light reflected by the original 507 passes through the transparent platen 502 and is then bent by the mirror 402, being guided into the lens unit 1. The lens unit 1 forms the image of the original 507 on the line sensor 401, which in turn converts the image into electronic data. An experiment was conducted by using an image forming apparatus. The resulting image data was good with as good resolution as the original 507. The original 507 had a resolution of 600 dpi. In other words, The original 507 contained every other dot of all dots spaced by PD=0.0423 mm.

While the second embodiment has been described in terms of a scanner that converts the image of an original into electronic data, the invention may also be applicable to sensors and switches that convert optical signals into electrical signals and an inputting/outputting apparatus that use the sensors and switches, biometric authentication apparatuses, communication devices, and dimension measuring devices. As described above, the second embodiment offers the equal advantages to the first embodiment, providing image data having a sufficiently equal image resolution to the first embodiment.

What is claimed is:

1. A lens array comprising:
    at least one row of lens elements formed in a single piece structure aligned substantially in a first direction perpendicular to optical axes of the lens elements having an incidence surface and an exit surface;
    at least one base portion extending in a second direction substantially perpendicular to the first direction and the optical axes and formed in a single piece structure with the lens elements; and
    at least one rib formed on the at least one base portion, the at least one rib extending in a third direction substantially parallel to the first direction,
    wherein the at least one rib extends in a fourth direction substantially parallel to the optical axes away from a first surface of the at least one base portion, and extends away in a fifth direction substantially parallel to the optical axes away from a second surface of the at least one base portion, the fourth direction being substantially opposite to the fifth direction.

2. A light emitting diode head incorporating the lens array according to claim 1.

3. An exposing unit incorporating the lens array according to claim 1.

4. An image forming apparatus incorporating the lens array according to claim 1.

5. An image reading apparatus incorporating the lens array according to claim 1.

6. A lens unit incorporating the lens array according to claim 1, the lens unit comprising:
    a shielding member including a plurality of diaphragms formed therein and aligned in a direction substantially perpendicular to the optical axes; and
    two lens arrays, each being the lens array of claim 1, the two lens arrays being mounted on the shielding member such that the diaphragms are located between two lens arrays, wherein the optical axes of the lens elements of one of the two lens arrays pass through corresponding diaphragms and are in line with optical axes of the lens elements of the other of the two lens arrays.

7. The lens array according to claim 1, wherein the rib and the lens elements are formed in a single piece structure.

8. The lens array according to claim 1, wherein the lens array is molded in a single piece structure.

9. The lens array according to claim 8, wherein the lens array is injection-molded.

10. The lens array according to claim 1, wherein the rib extends in the second direction further than the incident surface and the exit surface.

11. The lens array according to claim 1, wherein the at least one base portion is a plurality of base portions and the at least one rib is one of a plurality of ribs that extend substantially in parallel to each other with the row being disposed between two adjacent ribs.

12. The lens array according to claim 11, wherein the lens array has a substantially H-shaped cross-section taken in a plane substantially perpendicular to the first direction.

13. A lens unit incorporating the lens array according to claim 1, comprising:
    a shielding member including diaphragms formed therein and aligned in the first direction, the shielding member including in the first direction, the shielding member including an engagement portion,
    wherein the lens array is mounted on the shielding member such that the engagement portion engages a portion of the lens array to hold the lens array in position.

14. An image reading apparatus incorporating the lens unit according to claim 1.

15. A lens unit comprising:
    a shielding member including diaphragms formed therein and aligned in a first direction, the shielding member including at least one pair of first engagement portions aligned in a second direction substantially parallel to the first direction and at least one second engagement portion extending in a third direction substantially parallel to the first direction, the at least one second engagement portion being located between the pair of first engagement portions;
    a lens array mounted on the shielding member and including a plurality of lens elements aligned in a fourth direction substantially parallel to the first direction, the lens array including at least one pair of third engagement portions that engage the at least one pair of first engagement portions, the lens array being sandwiched between the second engagement portion and the pair of first engagement portions.

16. The lens unit according to claim 15, wherein the at least one pair of first engagement portions is one of a plurality of pairs of first engagement portions and the at least one second engagement portion is one of a plurality of second engagement portions.

17. The lens unit according to claim 15, wherein the lens array is injection molded.

18. A light emitting diode head incorporating the lens unit according to claim 15.

19. An exposing unit incorporating the lens unit according to claim 15.

20. An image forming apparatus incorporating the lens unit according to claim 15.

21. An image reading apparatus incorporating the lens array according to claim 15.

22. The lens unit according to claim 15, wherein the at least one second engagement portion is one of at least two second engagement portions,
   wherein the shielding member has a recess formed between adjacent second engagement portions so that the at least two second engagement portions are spaced by the recess, and the recess defines a gap between the lens array and the shielding member.

23. The lens unit according to claim 15, wherein the at least one pair of first engagement portions are in the shape of a hook and the at least one pair of third engagement portion are in the shape of a recess, and the lens array is held in abutting relation with the at least one second engagement portion.

24. The lens unit according to claim 15, wherein the lens array is injection-molded.

25. A light emitting diode head incorporating the lens unit according to claim 15.

26. An exposing unit incorporating the lens unit according to claim 15.

27. An image forming apparatus incorporating the lens unit according to claim 15.

28. A lens unit comprising:
   a shielding member including diaphragms formed therein and aligned in a first direction, the shielding member including a first engagement portion;
   a lens array including a plurality of lens elements aligned in a second direction substantially parallel to the first direction, the lens array including a second engagement portion for engaging the first engagement portion to correct deformation of the lens array,
   wherein the lens array is injection molded and includes an impressed recess caused by an ejector pin of a mold part when the lens array is pushed out of the mold part by the ejector pin,
   wherein the shielding member includes a third engagement portion located such that when the lens array is assembled to the shielding member, the third engagement portion is in a vicinity of the impressed recess.

* * * * *